United States Patent [19]

Bucci

[11] Patent Number: 4,887,652
[45] Date of Patent: Dec. 19, 1989

[54] SYSTEM FOR CONTROLLING THE RELEASE OF FUEL VAPORS FROM A VEHICLE FUEL TANK

[75] Inventor: George H. Bucci, Tolland, Conn.

[73] Assignee: Whitehead Engineered Products, Inc., Meriden, Conn.

[21] Appl. No.: 31,030

[22] Filed: Mar. 26, 1987

[51] Int. Cl.[4] .............................................. B65B 3/18
[52] U.S. Cl. .................................... 141/59; 141/286; 220/85 VR; 220/86 R
[58] Field of Search .............. 55/387; 123/519; 137/1, 137/14, 39, 43, 587, 588; 141/5, 7, 286, 301, 302, 303, 307; 220/85 F, 85 VR, 85 VS, 86 R, DIG. 33; 251/128, 144, 153, 235, 243, 244; 296/1 C

[56] References Cited

U.S. PATENT DOCUMENTS

| | | | |
|---|---|---|---|
| 3,380,619 | 4/1968 | Boddie | 220/44 |
| 3,394,842 | 7/1968 | Randolph et al. | 220/86 |
| 4,044,913 | 8/1977 | Brunnert | 220/86 R |
| 4,122,968 | 10/1978 | Germain | 220/86 R |
| 4,320,853 | 3/1982 | Moore | 220/DIG. 33 |
| 4,457,325 | 7/1984 | Green | 137/43 X |
| 4,572,394 | 2/1986 | Tanahashi et al. | 220/86 R |
| 4,625,777 | 12/1986 | Schmidt | 220/86 RX |
| 4,630,749 | 12/1986 | Armstrong et al. | 220/85 VSX |
| 4,659,346 | 4/1987 | Uranishi et al. | 220/85 VSX |
| 4,676,390 | 6/1987 | Harris | 220/DIG. 33 |
| 4,699,638 | 10/1987 | Harris | 55/168 |
| 4,706,708 | 11/1987 | Fornuto | 137/588 |
| 4,714,172 | 12/1987 | Morris | 220/DIG. 33 |
| 4,724,861 | 2/1988 | Covert | 141/302 |
| 4,747,508 | 5/1988 | Sherwood | 220/86 R |
| 4,760,858 | 8/1988 | Szlaga | 220/85 VR |
| 4,770,677 | 9/1988 | Harris | 220/85 VR |
| 4,795,050 | 1/1989 | Smith et al. | 220/85 VR |
| 4,809,863 | 3/1989 | Woodcock et al. | 220/85 VR |
| 4,816,045 | 3/1989 | Szlaga et al. | |

Primary Examiner—Henry J. Recla
Assistant Examiner—Glenn T. Barrett
Attorney, Agent, or Firm—Maurice M. Klee

[57] ABSTRACT

A fuel filler pipe assembly is provided which controls the release of fuel vapors from a vehicle fuel tank so as to limit the amount of fuel vapor released into the atmosphere. The assembly includes an outer tube which is partitioned into two conduits—one for carrying fuel to the vehicle's fuel tank and the other for carrying fuel vapors to an onboard vapor capture device. Passage of fuel vapors to the vapor capture device is controlled by a valve which itself is controlled by the attachment and detachment of a fuel filler cap to the assembly such that attachment of the cap causes the valve to close while detachment causes it to open. In certain preferred embodiments, the assembly includes a second valve for preventing the passage of substantial quantities of liquid fuel to the vapor capture device.

37 Claims, 7 Drawing Sheets

SYSTEM FOR CONTROLLING THE RELEASE OF FUEL VAPORS FROM A VEHICLE FUEL TANK

BACKGROUND OF THE INVENTION

This invention relates to a system for controlling the release of fuel vapors into the atmosphere from the fuel filler pipe of a vehicle's fuel tank.

As currently designed, vehicle fuel tanks normally operate under a positive pressure. Accordingly, when the filler cap for such a tank is removed, fuel vapors are released into the atmosphere. Similarly, as the tank is filled with fuel, fuel vapors in the tank are forced out of the tank into the atmosphere by the incoming fuel. The release of fuel vapors into the atmosphere under these conditions is undesirable for both environmental and health reasons.

The present invention is directed to controlling the release of fuel vapors into the atmosphere under the foregoing conditions. Specifically, rather than allowing the vapors to escape, the invention routes them to a vehicle-mounted, vapor capture device, such as, a charcoal canister, from which the vapors can be later removed and safely burned in the vehicle's engine.

In addition to controlling vapor escape, the invention also prevents liquid fuel from flowing into the vapor capture device during filling of the fuel tank. Moreover, the invention provides automatic relief for over pressure conditions within the vehicle's fuel tank, is easy to construct, reliable, crash-worthy, and can be readily installed in place of conventional filler pipe assemblies.

SUMMARY OF THE INVENTION

To achieve the foregoing and other goals, the invention provides a fuel filler pipe assembly comprising an outer tube whose lower end is connected to the vehicle's fuel tank and whose upper end is attached, for example, to the sheet metal of the vehicle. The tube has a mouth at its upper end for receiving fuel, to which a cap is attached during use to seal closed the mouth. Preferably, the cap has a male screw thread which mates with a corresponding female screw thread formed in the mouth of tube.

The inside of the outer tube includes a partition which divides the interior of the tube into two conduits—a first conduit for carrying fuel from the mouth to the fuel tank and a second conduit, isolated from the mouth, for carrying fuel vapors out of the fuel tank to the vapor capture device. In certain preferred embodiments of the invention, the partition is in the form of an inner tube disposed within the outer tube. For this configuration, the bore of the inner tube carries fuel from the mouth to the fuel tank, and the space between the inner and outer tubes carries fuel vapors to the vapor capture device.

Attached to the second conduit is a third conduit for connecting the second conduit to the vapor capture device. Passage of fuel vapors through the third conduit is controlled by a valve assembly. The state of this assembly, i.e., whether it is open or closed, is controlled by the attachment and detachment of the filler cap to the outer tube. Specifically, attachment of the cap causes the valve assembly to close so as to seal the fuel tank, while detachment causes the assembly to open so that fuel vapors are routed from the fuel tank to the vapor capture device.

In this way, the fuel tank can be pressurized during normal operation of the vehicle with the cap in place. As the cap is removed, the valve assembly opens thus venting substantially all of the pressurized fuel vapors within the tank to the vapor capture device, rather than allowing these vapors to escape into the atmosphere. Similarly, as fuel is introduced into the tank through the mouth of the tube, substantially all of the fuel vapors which are displaced by the entering fuel leave the tank through the second and third conduits and the open valve assembly, rather than through the mouth of the tube. To further ensure that the displaced fuel vapors leave the tank through the second and third conduits, a seal is preferably formed between the fuel filler nozzle and the first conduit.

In certain preferred embodiments of the invention, wherein a male screw thread is used on the cap and a female screw thread is formed in the mouth of the outer tube, the coordination between the opening and closing of the valve assembly and the detachment and attachment of the cap is achieved by the movement of the male screw thread within the female screw thread. In connection with these embodiments, it is further preferred to use a valve assembly which includes a normally-closed valve connected to a mechanical linkage which is activated by contact with the male screw thread as that thread rotates within the female screw thread.

As discussed in detail below, a preferred form of such a mechanical linkage comprises a pivoted cam arm, a spring which urges the cam arm into contact with the normally-closed valve to open that valve, a second pivoted cam arm which is contacted by the male screw thread, and a rotatable post which connects the two cam arms so that contact of the male screw thread with the second cam arm causes that arm to rotate which, in turn, rotates the first cam arm, moving it away from the valve so that the valve can close. As also discussed below, it is further preferred to place a vapor barrier between the cam arms so as to prevent fuel vapors from reaching the mouth of the outer tube by following the path of the mechanical linkage.

In addition to the foregoing, it is also preferred that the valve assembly include a normally-closed valve which is designed to open when the pressure within the fuel tank exceeds a predetermined value. In this way, excess pressure which may develop within the tank is automatically vented to the vapor capture device.

In connection with other preferred embodiments, a second valve is provided which closes the second conduit when liquid fuel reaches a predetermined level within the second conduit. This valve prevents substantial amounts of liquid fuel from being pumped into the vapor capture device during filling of the fuel tank. When such a valve is used and when a seal between the first conduit and the fuel filler nozzle is also used, it is further preferred to provide an overpressure or relief valve between the second conduit and the mouth of the outer tube so as to provide a path for fuel to leave the fuel tank if the automatic shut-off of the fuel filler pump should malfunction and not shut off the pump once the fuel tank has been filled or if the user should continue to pump fuel into the tank after the tank is full.

As discussed below, a preferred form for the second valve comprises a ball and seat valve employing a ball having a lower density than the liquid fuel so that the ball rises into the seat and closes off the second conduit as the level of fuel rises in that conduit. As also discussed below, in connection with this valve configuration, it is also preferred to baffle the second conduit so as to minimize the chance that liquid fuel splashed up during the filling process will reach the ball and close the valve before the fuel tank has been completely filled. In addition, it is preferred to place a ball, e.g., a metal ball, having a higher density than the liquid fuel below the ball with the lower density so that if the vehicle should roll over, the second valve will automatically close by means of the higher density ball forcing the lower density ball into the valve seat.

An important feature of the invention is the fact that in terms of its relationship to the vehicle, the assembly of the invention has basically the same structure as conventional filler pipes. Thus, as with a conventional filler pipe, there is only one connection between the assembly and the vehicle's fuel tank. Similarly, the mouth of the assembly is mounted to the vehicle in the same manner as conventional filler pipes. Accordingly, the assembly of the invention can be used in place of conventional filler pipes with a minimum of changes to the manufacturing process. Also, because of the similar structure and attachment points, crashworthiness of the overall fuel supply system is not compromised by the substitution of the assembly of the invention for a conventional filler pipe.

The accompanying drawings, which are incorporated in and constitute part of the specification, illustrate the preferred embodiments of the invention, and together with the description, serve to further explain the principles of the invention.

BRIEF DESCRIPTION OF THE DRAWINGS

FIG. 5 also illustrates the mating of the fuel tank's filler cap with the fuel filler pipe assembly.

FIGS. 8 and 9 are cross-sectional views along lines 8—8 in FIG. 4. FIGS. 10 and 11 are cross-sectional views along lines 10—10 in FIG. 4.

DESCRIPTION OF THE PREFERRED EMBODIMENTS

Figure 1:
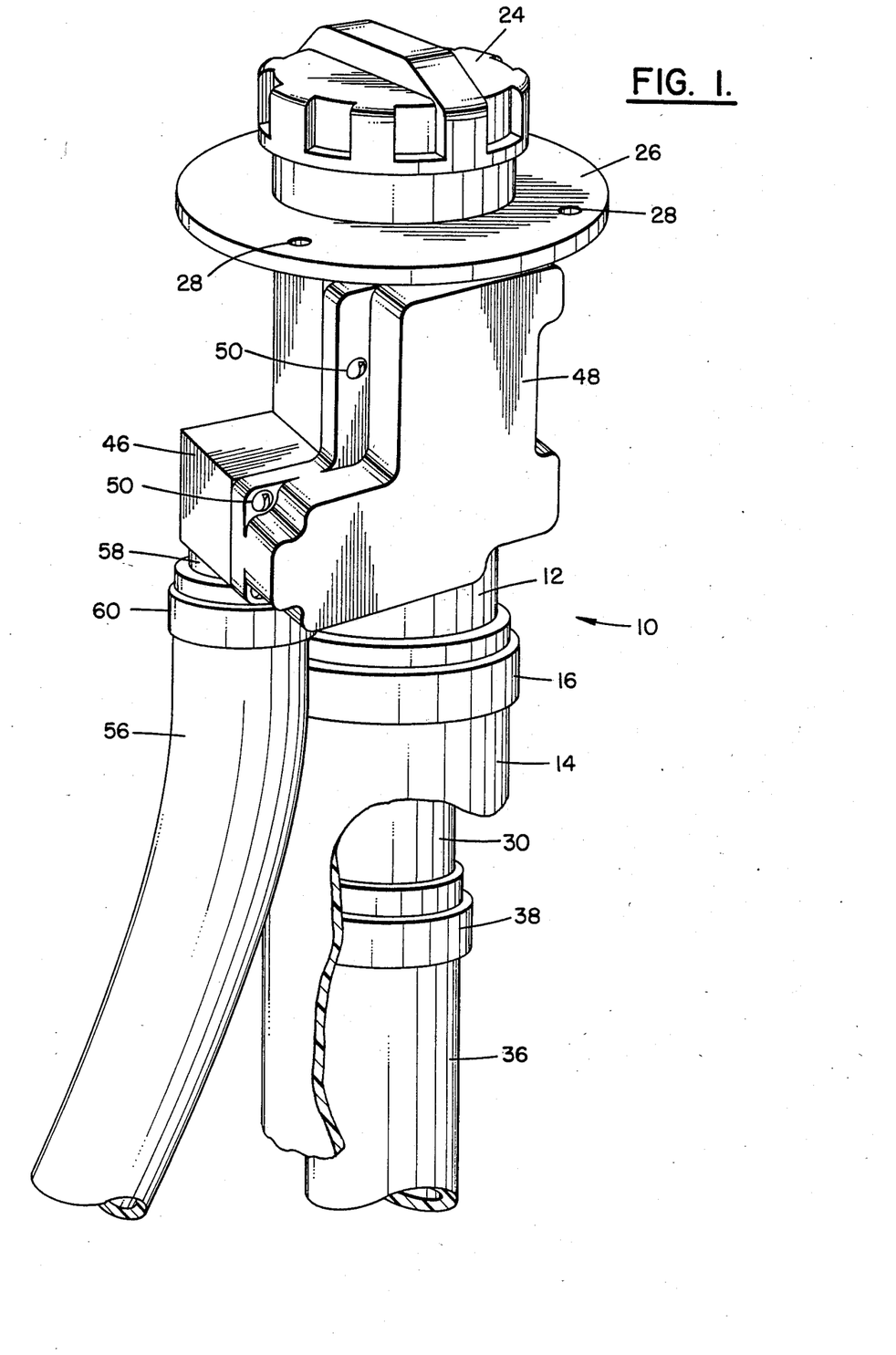
FIG. 1 is a perspective view of a fuel filler pipe assembly constructed in accordance with the present invention.
Figure 2:
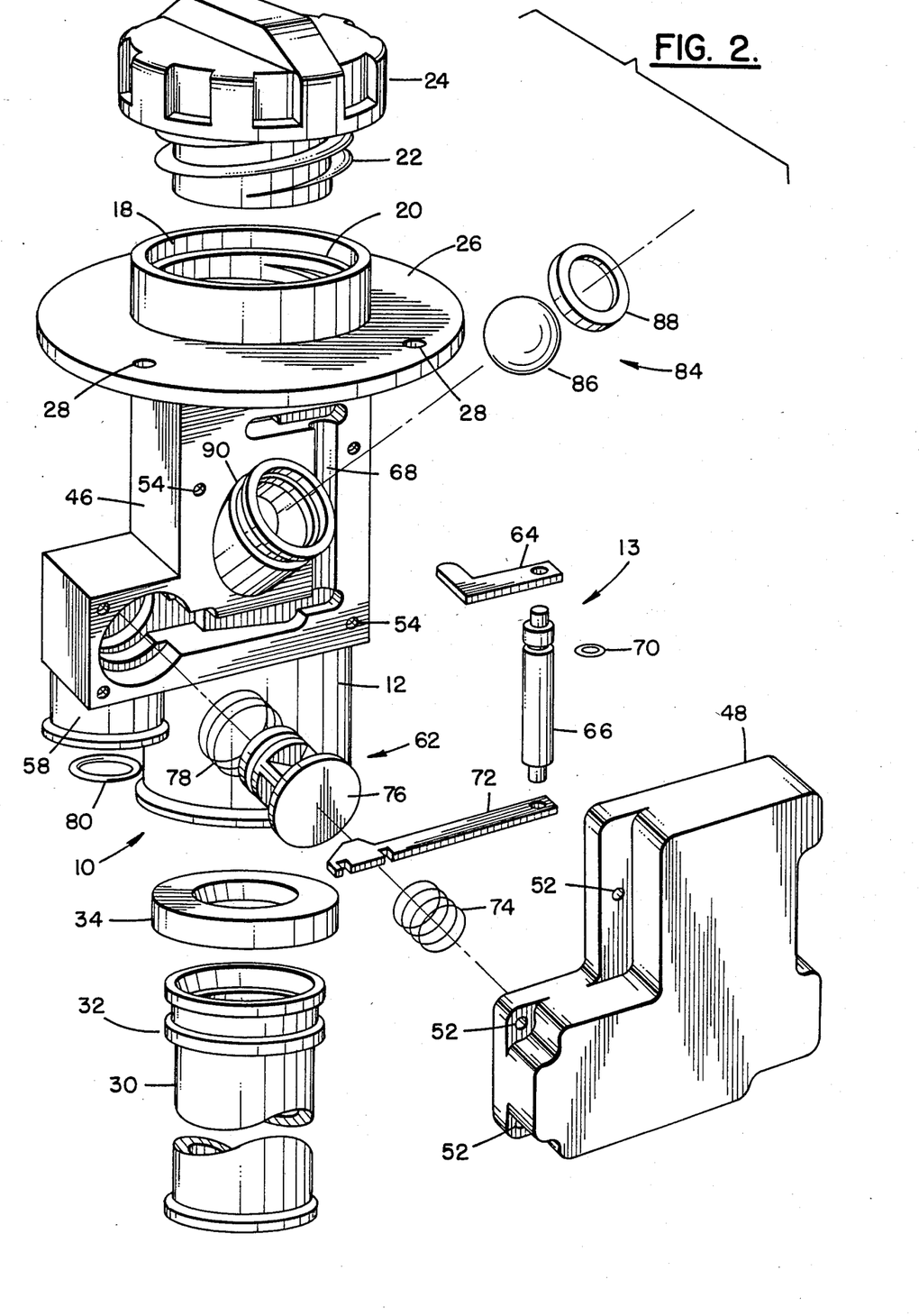
FIG. 2 is an exploded view of the assembly of FIG. 1.
Figure 3:
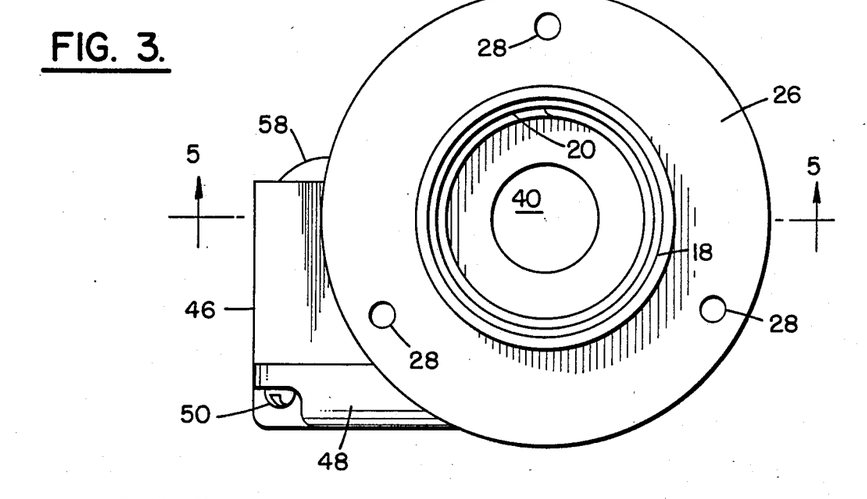
FIG. 3 is a top view of the assembly of FIG. 1 with the fuel filler cap removed.
Figure 4:
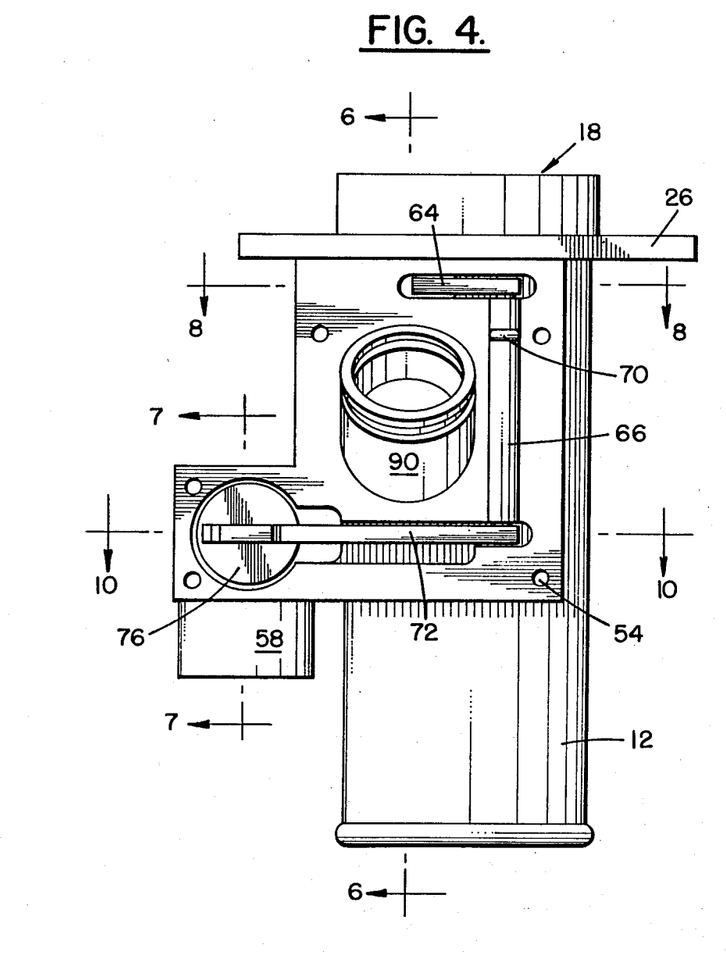
FIG. 4 is a side view of the assembly with the cover plate for the housing portion of the assembly removed.

With reference now to the drawings, wherein like reference characters designate like or corresponding parts throughout the several views, there is shown in FIGS. 1 and 2 a perspective and an exploded view, respectively, of fuel filler pipe assembly 10 constructed in accordance with the present invention.

Assembly 10 includes outer tube 12 which is attached to outer hose 14 by hose clamp 16. Outer hose 14, in turn, is attached to the vehicle's fuel tank (not shown) by, for example, a further hose clamp (not shown). At its upper end, outer tube 12 forms mouth 18 for receiving fuel. The inside surface of mouth 18 includes female screw thread 20 which mates with male screw thread 22 carried by cap 24. Flange 26 is attached to outer tube 12 in the region of mouth 18 and is used to mount assembly 10 to the vehicle by means of, for example, sheet metal screws which pass through screw holes 28.

Within outer tube 12 is located inner tube 30 which is attached to inner hose 36 by hose clamp 38. Inner hose 36 lies within outer hose 14. Depending on the desired level to which the vehicle's fuel tank is to be filled, inner hose 36 will either extend beyond outer outer hose 14 into the vehicle's fuel tank or will end within the outer hose. In either case, inner hose 36 is not clamped to the fuel tank, but simply rides within the outer hose. For some tank configurations, inner hose 36 can be eliminated.

The upper end of inner tube 30 is sealed to the inner surface of outer tube 12 by means of flange 32 and grommet 34. During filling of the vehicle's fuel tank, grommet 34 forms a seal around the fuel filler nozzle so as to prevent substantial amounts of fuel vapors form passing out of the fuel tank by means of inner tube 30. Inner tube 30 includes slit 106 which provides a passageway for fuel to move from conduit 42 to conduit 40 as the fuel tank becomes full (see FIG. 12.) The presence of fuel in conduit 40 serves to trigger the automatic shut off sensor (aspirator) used on conventional fuel pump nozzles to shut off the fuel pump when the fuel tank is full. Inner tube 30 also includes aperture 100 which provides a vent path for fuel vapors within conduit 40 which are displaced by the incoming fuel, that is, aperture 100 vents conduit 40 so that slit 106 does not become vapor locked.

Outer tube 12 and inner tube 30 are preferably made of a plastic material, such as, for example, nylon or polyester, and can be fastened to each other by, for example, ultrasonic welding. Grommet 34 is preferably made of a fluoroelastomer.

Inner tube 30 functions as a partition and divides the interior of outer tube 12 into conduits 40 and 42. Conduit 40 extends from mouth 18 towards the fuel tank and serves to carry fuel from the mouth into the tank. Conduit 42 extends away from the fuel tank, is isolated from mouth 18, and serves to carry fuel vapors out of the fuel tank.

As can be seen most clearly in FIGS. 1-2, the upper portion of assembly 10 includes housing 46 and cover plate 48 which are attached together by screws 50 which pass through screw holes 52 in the cover plate and are received in screw holes 54 in the housing. Alternatively and preferably, the housing and outer tube 12 are molded as a single unit out of a plastic material, such as those discussed above, the cover plate is also made of plastic, and the housing and the cover plate are attached together by ultrasonic welding.

As shown in FIG. 1, hose 56 is attached to housing 46 at port 58 by means of hose clamp 60. Hose 56 leads to a vapor capture device (not shown), such as, a charcoal canister, which is mounted on the vehicle at a suitable location.

Figure 5:
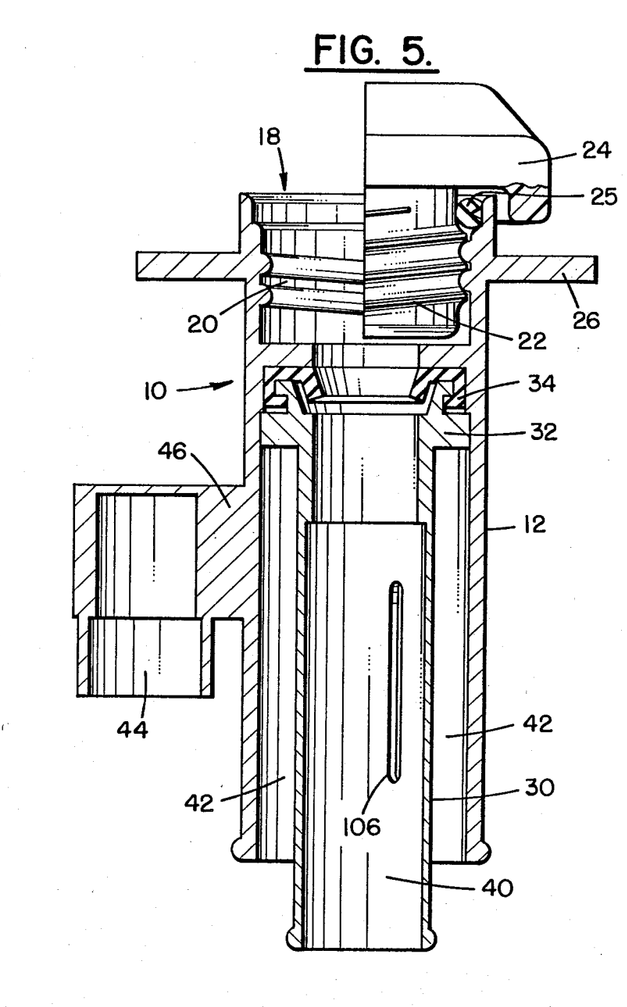
FIG. 5 is a cross-sectional view along lines 5—5 in FIG. 3.

Housing 46 and cover plate 48 together form conduit 44 (see FIGS. 5-7) for connecting conduit 42 to the vapor capture device. Housing 46 and cover plate 48 also contain and form part of valve assembly 13 whereby conduit 44 is opened and closed in coordination with the detachment and attachment of cap 24 to mouth 18.

Valve assembly 13 includes: normally-closed valve 62; upper cam arm 64; lower cam arm 72: cylindrical post 66, which is journaled in cylindrical housing 68 formed in housing 46 and a corresponding cylindrical housing formed in cover 48 (not shown): 0-ring 70, which is received on post 66 and forms a seal between the post and the wall of the cylindrical housing so as to create a vapor barrier between the upper and lower cam arms; and spring 74, which urges lower cam arm 72 into contact with valve 62 so as to move the valve into its open position. Cylindrical post 66 connects lower cam arm 72 to upper cam arm 64 so that rotation of the upper cam arm results in corresponding rotation of the lower cam arm.

Figure 7:
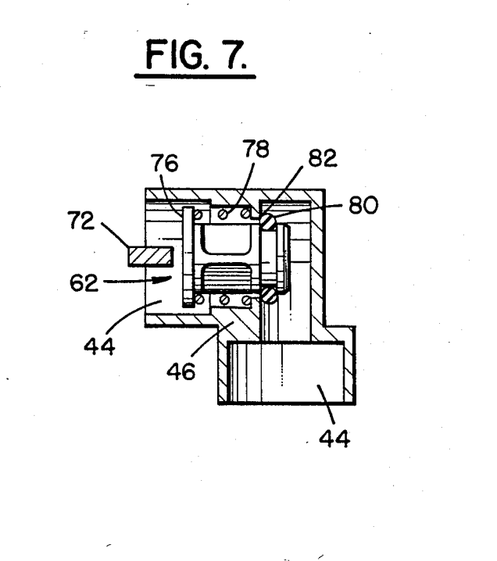
FIG. 7 is a cross-sectional view along lines 7—7 in FIG. 4.

As can be seen most clearly in FIG. 7, valve 62 includes piston 76, spring 78, and 0-ring 80 which mates with surface 82 of housing 46 to close the valve. Spring 78 is preferably chosen so that valve 62 will automatically open at a predetermined pressure, e.g., a pressure on the order of 1-2 psi, so as to relieve excess pressure within the fuel tank such as can occur under hot environmental conditions.

Figure 8:
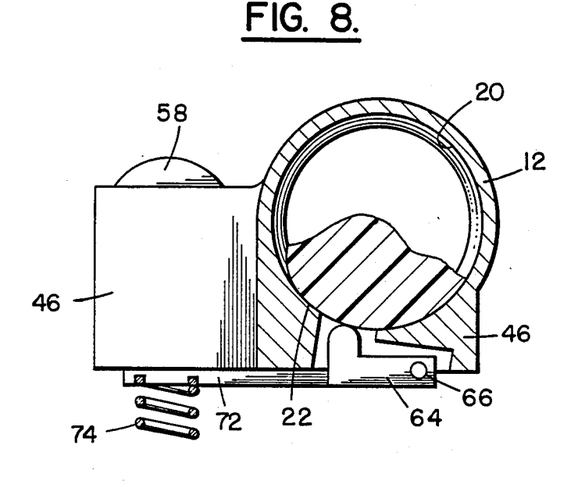
FIGS. 8-11 illustrate the coordination between the opening and closing of the assembly's vapor control valve and the detachment and attachment of the fuel filler cap to the assembly.
Figure 9:
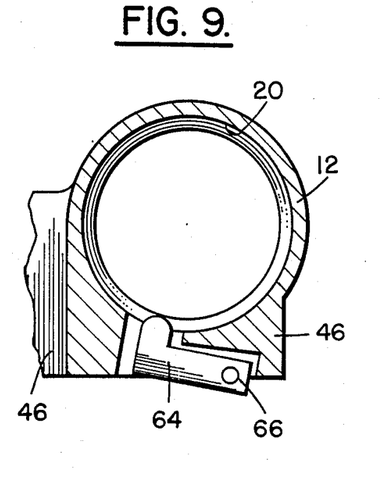
Figure 10:
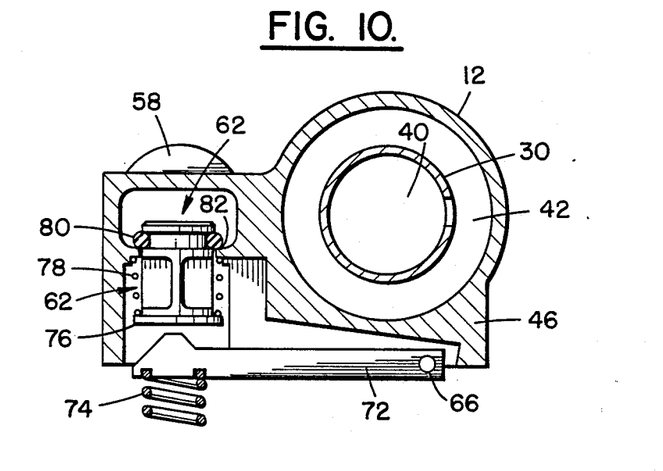
Figure 11:
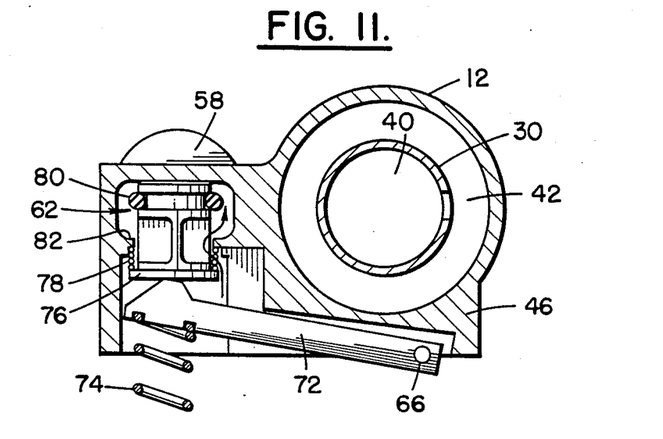

The coordination between the opening and closing of valve 62 and the rotation of male thread 22 in female thread 20 is illustrated in FIGS. 8-11, where FIGS. 8 and 10 show the positions of upper cam arm 64, lower cam arm 72, spring 74, and valve 62 when the male thread is in engagement with upper cam arm 64, and FIGS. 9 and 11 show the positions of the same components when the male thread is out of engagement with the upper cam arm.

Figure 6:
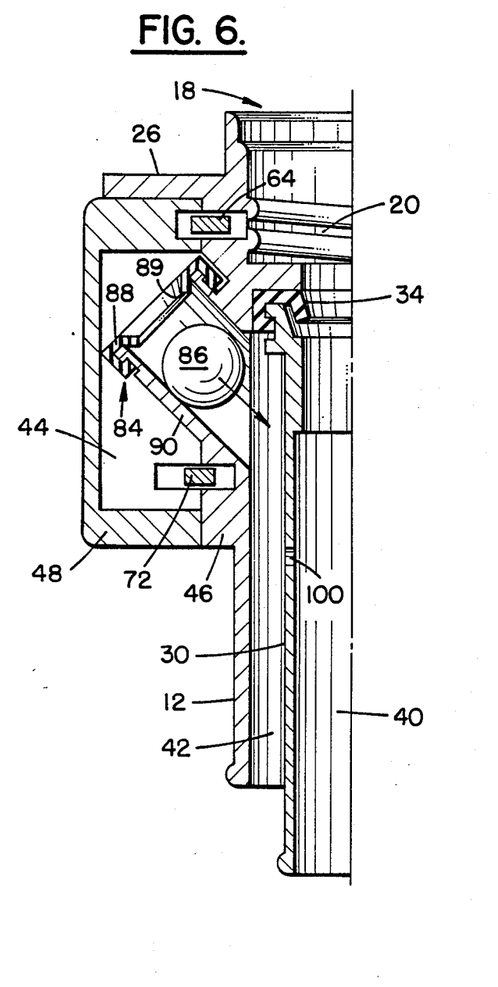
FIG. 6 is a cross-sectional view along lines 6—6 in FIG. 4.

As shown in these figures, engagement causes lower arm 72 to rotate counterclockwise against the force of spring 74 thus allowing valve 62 to move into its normally closed position, while disengagement allows spring 74 to move lower arm 72 into contact with valve piston 76 so as to open the valve by disengaging 0-ring 80 from surface 82. As shown in FIG. 6, upper arm 64 is preferably located towards the bottom of female screw thread 20 so that valve 62 opens at the beginning of the process of removing cap 24 from mouth 18. In particular, valve 62 opens before seal 25 carried by cap 24 disengages from mouth 18 of the assembly (see FIG. 5). In this way, any residual pressure which may be in the fuel tank is vented into the vapor capture device prior to removal of the cap, thus preventing the escape of fuel vapors into the atmosphere.

Figure 12:
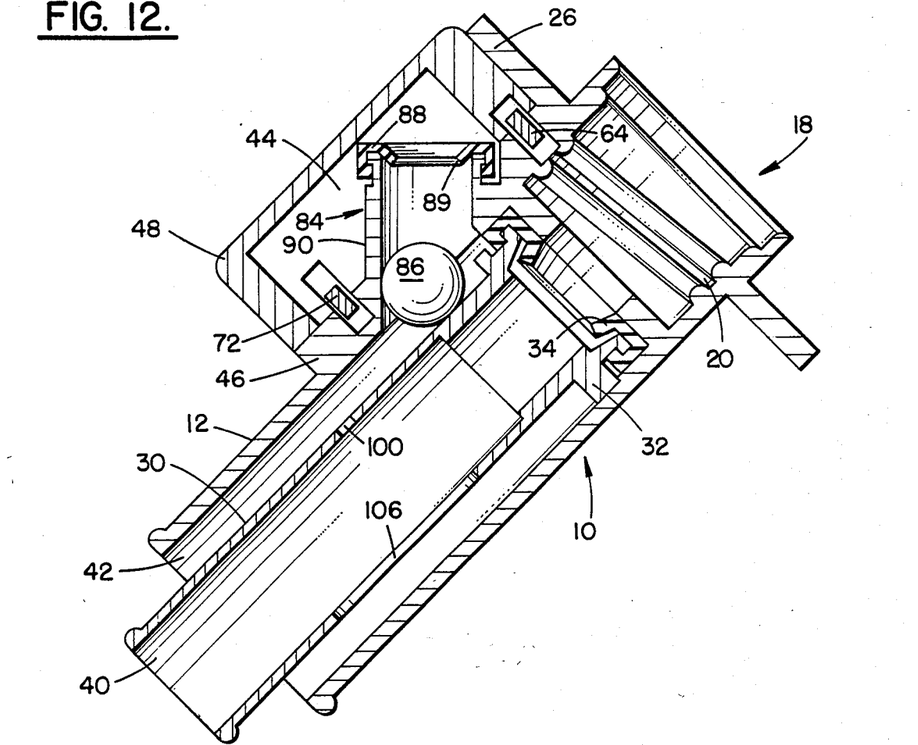
FIG. 12 is a cross-sectional view along lines 6—6 in FIG. 4 illustrating the orientation of the filler pipe assembly when mounted to a vehicle.

In addition to valve 62, assembly 10 also includes valve 84 which closes conduit 42 as liquid fuel reaches a predetermined height in that conduit. As shown in FIG. 6, ball 86 which seats in seal 88 can be used for this purpose. As shown in FIG. 12, assembly 10 is mounted on the vehicle so that ball 86 moves essentially vertically, i.e., the assembly is mounted so that housing 90 for ball 86 is oriented vertically. Ball 86, which must have a lower density than the fuel used in the vehicle, can be a hollow ball made out of polypropylene. Seal 88 includes flexible lip 89 which, along with the vertical movement of the ball, helps prevent the ball from hanging up on the seal.

Figure 13:
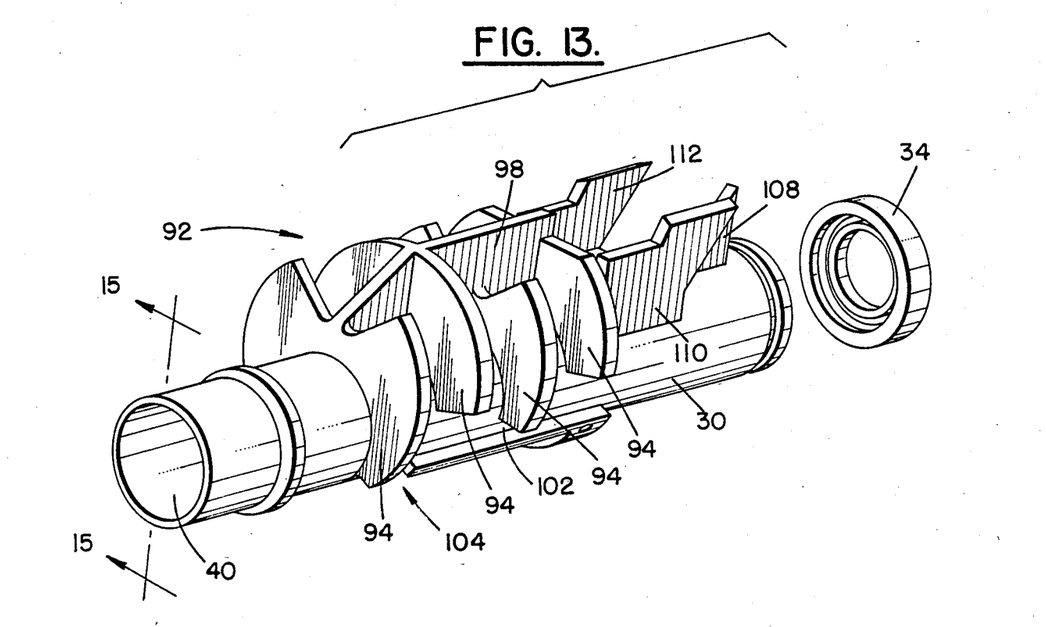
FIG. 13 is a perspective view of a baffle assembly for use with the present invention.
Figure 14:
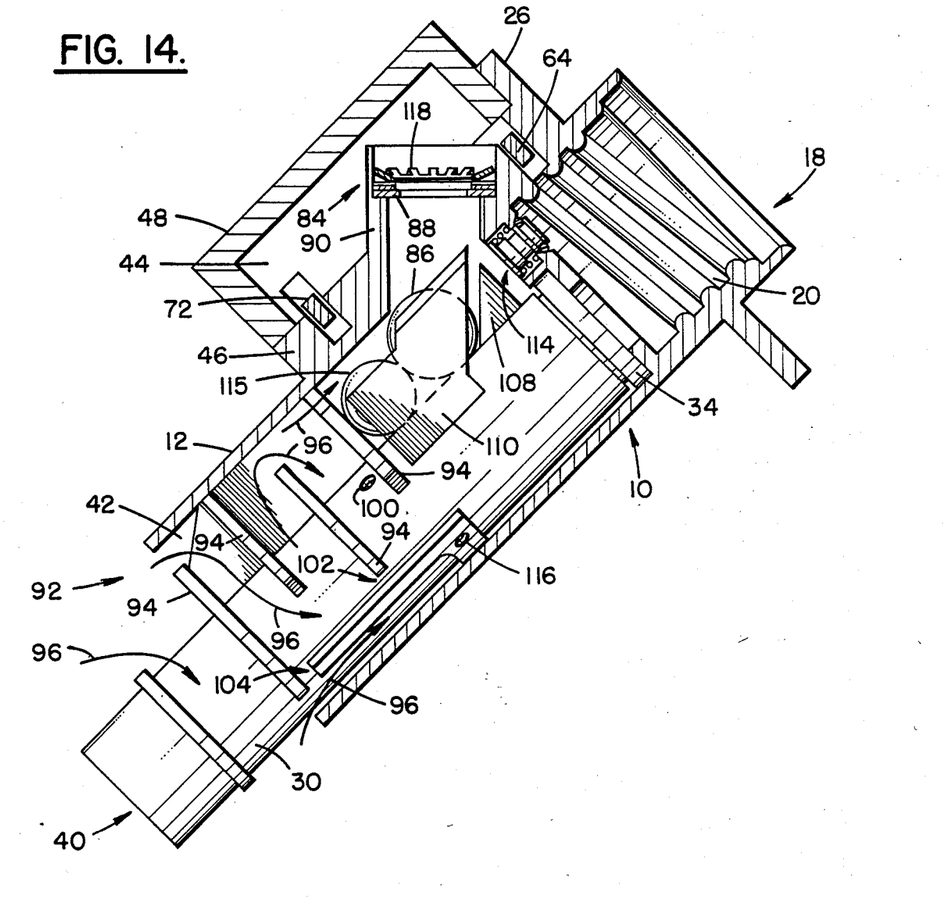
FIG. 14 is a perspective view, partially in section, illustrating the fuel filler pipe assembly with the baffle assembly of FIG. 13 in place.
Figure 15:
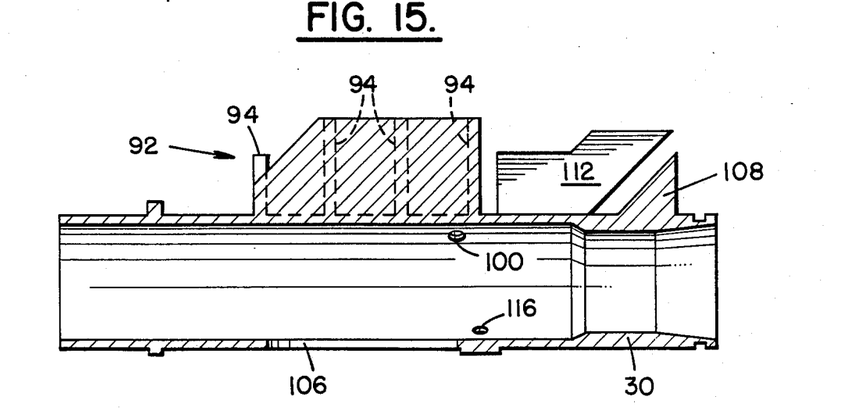
FIG. 15 is a cross-sectional view along lines 15—15 in FIG. 13.

FIGS. 13-15 illustrate the use of baffle assembly 92 for controlling splashing of liquid fuel onto ball 86. Because of the pumping rates used, the filling of a vehicle fuel tank by means of a conventional service station fuel pump results in substantial splashing of the liquid fuel within the fuel tank. This splashing can cause ball 86 to move upward in housing 90 and seat in seal 88 before the fuel tank has been completely filled. This seating, in turn, causes back pressure in conduits 40 and 42 which shuts off the service station fuel pump.

Moreover, if a grommet 34 has been used which forms a seal with the fuel pump's nozzle, as is preferred, ball 86 will remain seated in seal 88 even after the fuel pump has shut itself off, due to the internal pressure within the fuel tank produced by 1) the action of the fuel pump prior to shut off, and 2) the vapor pressure of the fuel in the fuel tank. Although this internal pressure will eventually bleed off through leakage around grommet 34, as a practical matter, to resume pumping in a reasonable amount of time, the user will need to remove the fuel pump nozzle from the filler pipe assembly in order to vent the internal pressure. Baffle assembly 92, by blocking the passage of splashed fuel to ball 86, minimizes the chances that such premature seating of ball 86 in seal 88 will occur before the fuel tank has been fully filled.

As shown in FIGS. 13-15, baffle assembly 92 can consist of a series of four transverse baffles 94 and a midline baffle 98. These baffles create the circuitous route illustrated by arrows 96 in FIG. 14 which fuel must follow to reach ball 86. In practice, it has been found that substantially no fuel splashes are large enough or have sufficient energy to traverse the full circuit and then move ball 86 up into seal 88 without first having entered slot 106 and contacted the aspirator on the nozzle of the service station fuel pump, thus shutting off that pump. Baffle assembly 92 also includes drain passages 102 and 104 which rapidly drain splashed fuel back into the tank so as to minimize the chance that multiple splashes will combine with one another to move the ball. Other baffle constructions besides the one illustrated in the figures can be used in the practice of the invention. For example, six baffles, rather than four baffles, can be used to provide even greater splash protection for ball 86.

As shown in the figures, baffle assembly 92 is conveniently formed on the outside surface of inner tube 30. In addition to the baffle assembly, guide members 108, 110 and 112, which control the movement of ball 86, are also formed on this surface. As shown in FIG. 14, valve 84 preferably includes a second ball 115. This ball is denser than the liquid fuel and thus remains in contact with top baffle 94 during normal operation of the vehicle. As such, it serves as an additional obstacle for splashed fuel. If a vehicle should roll over during accident, ball 115 serves the important function of forcing ball 86 into seal 88 thus preventing fuel from draining out of the fuel tank through conduits 42 and 44. Ball 115 can be made of, for example, stainless steel.

As also shown in FIG. 14, filler pipe assembly 10 preferably includes relief valve 114. This normally-closed valve is designed to open when the pressure in conduit 42 exceeds a predetermined value, such as 1-2 psi. Under normal conditions, this valve remains shut during filling of the fuel tank. However, if valve 84 should close during filling and if fuel should continue to be pumped into the tank, valve 114 will open allowing the excess fuel to pass out of conduit 42 and into mouth 18, thus relieving excess tank pressure and alerting the operator that the service station fuel pump has malfunctioned.

Inner tube 30 and its associated baffle assembly 92 can be attached to outer tube 12 by means of screws (not shown) and screw holes 116. Alternatively, the two tubes can be bonded together by, for example, ultrasonic welding. Grommet 34 forms a seal between the upper end of inner tube 30 and the body of outer tube 12. Grommet 34 also forms a seal about the fuel pump nozzle when the nozzle is inserted into conduit 40. As shown in FIG. 14, inner tube 30 is offset from the center line of outer tube 12. This permits the spring used on some fuel pump nozzles to engage threads 20 in mouth 18 of the filler pipe assembly. As further shown in FIG. 14, seal 88 can be held in place by retaining ring 118.

Based on the foregoing, the operation of the fuel filler pipe assembly of the present invention is as follows. When cap 24 is in place on outer tube 12, the assembly seals the vehicle's fuel tank by means of normally-closed valve 62 and seal 25 carried by the cap. Should excess pressure develop in the tank, valve 62 opens to vent the excess pressure into the vapor capture device through conduits 42 and 44 and hose 56.

When cap 24 is removed from outer tube 12, valve 62 automatically opens so that the fuel vapors within the tank are vented to the vapor capture device. During filling of the tank with fuel, valve 62 remains open so that the vapors displaced by the incoming fuel pass through the valve into the vapor capture device. As the tank becomes full, liquid fuel rises in conduit 42 causing ball 86 to seat in seal 88. This prevents substantial quantities of liquid fuel from flowing through conduits 42 and 44 into the vapor capture device. When cap 24 is replaced on outer tube 12, valve 62 closes and the fuel tank is once again sealed.

The components of the fuel filler pipe assembly of the present invention can be made of standard materials used in the automotive industry. For example, as discussed above, outer tube 12, inner tube 30, housing 46, and cover plate 48 can be made of nylon or polyester. Valve piston 76 can also be made out of these materials. O-rings 70 and 80, as well as seal 88 and grommet 34, can be made of a fluoroelastomer, while post 66 and cam arms 64 and 72 can be made of metal or high strength thermoplastic materials. Other suitable materials for the components making up the filler pipe assembly will be evident to persons skilled in the art in view of the present disclosure.

Although specific embodiments of the invention have been described and illustrated, it is to be understood that modifications can be made without departing from the invention s spirit and scope. For example, partitions other than inner tube 30 can be used to form two conduits within outer tube 12. Similarly, the components of the invention can be arranged relative to one another in a variety of configurations other than those shown.

What is claimed is:

1. A fuel filler pipe assembly for attachment to a fuel tank comprising:
   (a) a cap which includes a male screw thread;
   (b) an outer tube for attachment to the fuel tank having a mouth for receiving fuel and means for attaching the cap to the tube to seal closed the mouth comprising a female screw thread formed in the mouth which is complementary to the male screw thread on the cap;
   (c) a partition located within the outer tube which divides the interior of the tube into a first conduit extending from the mouth towards the fuel tank for carrying fuel from the mouth to the fuel tank and a second conduit, isolated from the mouth and extending away from the fuel tank, for carrying fuel vapors out of the fuel tank;
   (d) a third conduit for connecting the second conduit to a vapor capture device; and
   (e) valve means for opening and closing the third conduit, said means being operated by the attachment and detachment of the cap to the outer tube such that attachment moves the cap into contact with the valve means to close the valve means so as to seal the fuel tank and detachment moves the cap out of contact with the valve means to open the valve means so that fuel vapors are routed from the fuel tank to the vapor capture device, said valve means including a normally-closed valve and spring-loaded means which contacts the valve and moves the valve into its open position, the attachment of the cap to the outer tube moving the cap into contact with the spring-loaded means so as to move the spring-loaded means away from the valve so that the valve moves into its closed position.

2. The assembly of claim 1 wherein the rotation of the male screw thread within the female screw thread to attach the cap to the outer tube moves the spring-loaded means away from the valve so that the valve moves into its closed position.

3. The assembly of claim 2 wherein the spring-loaded means includes a first pivoted arm, a spring which urges the first arm into contact with the valve, a second pivoted arm which is contacted by the male screw thread as that thread is rotated in the female screw thread, and means for connecting the first arm to the second arm so that rotation of the second arm in response to contact with the male screw thread results in corresponding rotation of the first arm to move the first arm away from the valve against the force of the spring.

4. The assembly of claim 3 wherein the spring-loaded means includes means for forming a vapor barrier between the first and second pivot arms to prevent fuel vapors from passing out of the fuel tank into the mouth of the outer tube.

5. The assembly of claim 4 wherein the assembly includes a housing and wherein the means for connecting the first arm to the second arm comprises a post journaled in the housing and the means for forming a vapor barrier comprises an O-ring which is received on the post and forms a seal between the post and the housing.

6. The assembly of claim 1 wherein the normally-closed valve opens when the pressure within the fuel tank exceeds a predetermined value so as to vent excess pressure within the tank to the vapor capture device.

7. The assembly of claim 1 further including a second valve which closes the second conduit when liquid fuel reaches a predetermined level within the second conduit.

8. The assembly of claim 7 wherein the second valve comprises a ball and seat valve, the ball having a lower density than the liquid fuel.

9. The assembly of claim 8 wherein the second conduit includes baffle means for retarding the flow of splashed fuel onto the ball.

10. The assembly of claim 9 wherein the baffle means includes drain passages for draining splashed fuel away from the ball.

11. The assembly of claim 9 wherein (a) the partition is in the form of an inner tube located within the outer tube, (b) the first conduit comprises the bore of the inner tube, (c) the second conduit comprises the space between the inner and outer tubes, and (d) the baffle means are formed on the outside surface of the inner tube.

12. The assembly of claim 8 further including a second ball which is located below the first ball when the assembly has been attached to the fuel tank and which has a higher density than the liquid fuel, said second ball forcing the first ball into the seat when the assembly and the fuel tank are inverted.

13. The assembly of claim 7 further including:
(a) means for forming a seal between the first conduit and a fuel filler nozzle; and
(b) a normally-closed third valve between the second conduit and the mouth of the outer tube which opens when the pressure within the second conduit exceeds a predetermined value.

14. The assembly of claim 13 wherein the partition includes a passageway for conducting fuel from the second conduit to the first conduit as the fuel tank becomes filled with fuel.

15. The assembly of claim 14 wherein the partition includes an aperture for allowing fuel vapor to exit from the first conduit as fuel enters that conduit through the passageway.

16. The assembly of claim 1 wherein the partition is in the form of an inner tube located within the outer tube and wherein the first conduit comprises the bore of the inner tube and the second conduit comprises the space between the inner tube and the outer tube.

17. The assembly of claim 2 wherein:
(a) the normally-closed valve opens when the pressure within the fuel tank exceeds a predetermined value so as to vent excess pressure within the tank to the vapor capture device;
(b) the partition is in the form of an inner tube located within the outer tube;
(c) the first conduit comprises the bore of the inner tube and the second conduit comprises the space between the inner tube and the outer tube; and
(d) the assembly includes:
(i) means for forming a seal between the first conduit and a fuel filler nozzle;
(ii) a second valve which closes the second conduit when liquid fuel reaches a predetermined level within the second conduit; and
(iii) a normally-closed third valve between the second conduit and the mouth of the outer tube which opens when the pressure within the second conduit exceeds a predetermined value.

18. The assembly of claim 17 wherein the second valve comprises a ball and seal valve, the ball having a lower density than the liquid fuel.

19. The assembly of claim 18 wherein the spring-loaded means includes a first pivoted arm, a spring which urges the first arm into contact with the normally-closed valve, a second pivoted arm which is contacted by the male screw thread as that thread is rotated in the female screw thread, and means for connecting the first arm to the second arm so that rotation of the second arm in response to contact with the male screw thread results in corresponding rotation of the first arm to move the first arm away from the normally-closed valve against the force of the spring.

20. The assembly of claim 19 wherein the spring-loaded means includes means for forming a vapor barrier between the first and second pivot arms to prevent fuel vapors from passing out of the fuel tank into the mouth of the outer tube.

21. The assembly of claim 20 wherein the assembly includes a housing and wherein the means for connecting the first arm to the second arm comprises a post journaled in the housing and the means for forming a vapor barrier comprises an O-ring which is received on the post and forms a seal between the post and the housing.

22. The assembly of claim 18 wherein the second conduit includes baffle means for retarding the flow of splashed fuel onto the ball, said baffle means including drain passages for draining splashed fuel away from the ball.

23. The assembly of claim 22 wherein the baffle means are formed on the outside surface of the inner tube.

24. The assembly of claim 18 further including a second ball which is located below the first ball when the assembly has been attached to the fuel tank and which has a higher density than the liquid fuel, said second ball forcing the first ball into the seat when the assembly and the fuel tank are inverted.

25. The assembly of claim 17 wherein the inner tube includes a passageway for conducting fuel from the second conduit to the first conduit as the fuel tank becomes filled with fuel.

26. The assembly of claim 25 wherein the inner tube includes an aperture for allowing fuel vapor to exit from the first conduit as fuel enters that conduit through the passageway.

27. Apparatus for controlling the release of fuel vapors from a vehicle fuel tank comprising:
(a) a cap which includes a male screw thread;
(b) a first conduit for receiving a fuel filler nozzle, said conduit having a mouth at one end;
(c) means for attaching the cap to the mouth to seal closed the mouth comprising a female screw thread formed in the mouth which is complementary to the male screw thread on the cap;
(d) a vapor-carrying conduit for carrying fuel vapors to a vapor capture device, said conduit being isolated from the mouth;
(e) valve means for opening and closing the vapor-carrying conduit, said means being operated by the attachment and detachment of the cap to the mouth such that attachment moves the cap into contact with the valve means to close the valve means and detachment moves the cap out of contact with the valve means to open the valve means, said valve means including a normally-closed valve and spring-loaded means which contacts the valve and moves the valve into its open position, the attachment of the cap to the outer tube moving the cap into contact with the spring-loaded means so as to move the spring-loaded means away from the valve so that the valve moves into its closed position; and (f) a second valve which closes the vapor-carrying conduit when liquid fuel reaches a predetermined level within that conduit.

28. The apparatus of claim 27 wherein rotation of the male screw thread within the female screw thread to attach the cap to the mouth moves the spring-loaded means away from the valve so that the valve moves into its closed position.

29. The apparatus of claim 27 wherein the normally-closed valve opens when the pressure within the vapor-carrying conduit exceeds a predetermined value.

30. The apparatus of claim 28 wherein the second valve comprises a ball and seat valve, the ball having a lower density than the liquid fuel.

31. The apparatus of claim 30 wherein the vapor-carrying conduit includes baffle means for retarding the flow of liquid fuel onto the ball.

32. The apparatus of claim 31 wherein the baffle means includes drain passages for draining liquid fuel away from the ball.

33. The apparatus of claim 30 further including a second ball which is located below the first ball when the apparatus has been attached to the fuel tank and which has a higher density than the liquid fuel, said second ball forcing the first ball into the seat when the apparatus and the fuel tank are inverted.

34. The apparatus of claim 27 further including:
(a) means for forming a seal between the first conduit and the fuel filler nozzle; and
(b) a normally-closed third valve between the vapor-carrying conduit and the mouth of the first conduit which opens when the pressure within the vapor-carrying conduit exceeds a predetermined value.

35. The apparatus of claim 27 further including a passageway between the vapor-carrying conduit and the first conduit below the level of the mouth for conducting liquid fuel from the vapor-carrying conduit to the first conduit.

36. The apparatus of claim 35 further including an aperture between the first conduit and the vapor-carrying conduit below the level of the mouth for allowing fuel vapor to exit from the first conduit as fuel enters that conduit through the passageway.

37. Apparatus for controlling the release of fuel vapors from a vehicle fuel tank comprising:
(a) a cap which includes a male screw thread;
(b) a first conduit for receiving a fuel filler nozzle, said conduit having a mouth at one end;
(c) means for attaching the cap to the mouth to seal closed the mouth comprising a female screw thread formed in the mouth which is complementary to the male screw thread on the cap;
(d) a vapor-carrying conduit for carrying fuel vapors to a vapor capture device, said conduit being isolated from the mouth;
(e) first valve means for opening and closing the vapor-carrying conduit, said means being operated by the attachment and detachment of the cap to the mouth such that attachment moves the cap into contact with the first valve means to close said means and detachment moves the cap out of contact with the first valve means to open said means;
(f) second valve means for closing the vapor-carrying conduit when liquid fuel reaches a predetermined level within that conduit, said second valve means comprising a ball and seat valve, the ball having a lower density than the liquid fuel; and
(g) baffle means for retarding the flow of liquid fuel onto the ball of said ball and seat valve.

* * * * *